United States Patent
Thompson et al.

(10) Patent No.: US 8,172,480 B2
(45) Date of Patent: *May 8, 2012

(54) NODE STORAGE, DEPLOYMENT AND RETRIEVAL SYSTEM

(75) Inventors: James N. Thompson, Sugar Land, TX (US); Jerry L. Laws, Huntsville, TX (US); Larry E. Berges, New Iberia, LA (US)

(73) Assignee: Fairfield Industries Incorporated, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/011,714

(22) Filed: Jan. 21, 2011

(65) Prior Publication Data

US 2011/0176875 A1    Jul. 21, 2011

Related U.S. Application Data

(63) Continuation of application No. 12/165,234, filed on Jun. 30, 2008, now Pat. No. 7,883,292.

(51) Int. Cl.
*B63B 35/04* (2006.01)
(52) U.S. Cl. ...................................... 405/166; 405/168.3
(58) Field of Classification Search .................. 405/158, 405/166, 168.3, 169, 173
See application file for complete search history.

(56) References Cited

U.S. PATENT DOCUMENTS

| | | |
|---|---|---|
| 4,920,680 A | 5/1990 | Lindgren |
| 5,189,642 A | 2/1993 | Donoho et al. |
| 5,197,716 A | 3/1993 | Zibilich et al. |
| 5,199,659 A | 4/1993 | Zibilich, Jr. |
| 5,623,455 A | 4/1997 | Norris |
| 5,624,207 A | 4/1997 | Berges |
| 5,655,753 A | 8/1997 | Berges et al. |
| 5,724,241 A | 3/1998 | Wood et al. |
| 5,902,072 A | 5/1999 | Berges |
| 7,025,534 B2 | 4/2006 | Martin et al. |
| 7,066,687 B2 | 6/2006 | Martin et al. |
| 7,310,287 B2 | 12/2007 | Ray et al. |
| 7,649,803 B2 * | 1/2010 | Ray et al. ...................... 405/158 |
| 7,804,737 B2 * | 9/2010 | Thompson ...................... 367/15 |
| 7,883,292 B2 * | 2/2011 | Thompson et al. ........... 405/166 |
| 7,990,803 B2 * | 8/2011 | Ray et al. ......................... 367/15 |
| 2008/0279636 A1 | 11/2008 | Ray et al. |
| 2009/0052992 A1 | 2/2009 | Thompson et al. |
| 2010/0054078 A1 * | 3/2010 | Thompson et al. ............. 367/20 |

* cited by examiner

*Primary Examiner* — Frederic L Lagman
(74) *Attorney, Agent, or Firm* — Patterson & Sheridan, LLP

(57) ABSTRACT

A marine vessel is provided. The marine vessel comprises a cable handling system disposed on the marine vessel between a leading end and a trailing end of the vessel. The cable handling system comprises a cable handler positioned proximate the trailing end and a cable storage device positioned forward of the cable handler, the cable storage device and the cable handler adapted to receive a flexible cable and define a portion of a cable path therebetween. The marine vessel also comprises a seismic device storage structure extending between the leading end and the trailing end and disposed substantially parallel to the cable path, a ramp coupled to a portion of the trailing end of the vessel aft of the cable handler, and a staging section disposed between the seismic device storage structure and the ramp to provide transfer of seismic devices between the seismic device storage structure and the ramp.

18 Claims, 8 Drawing Sheets

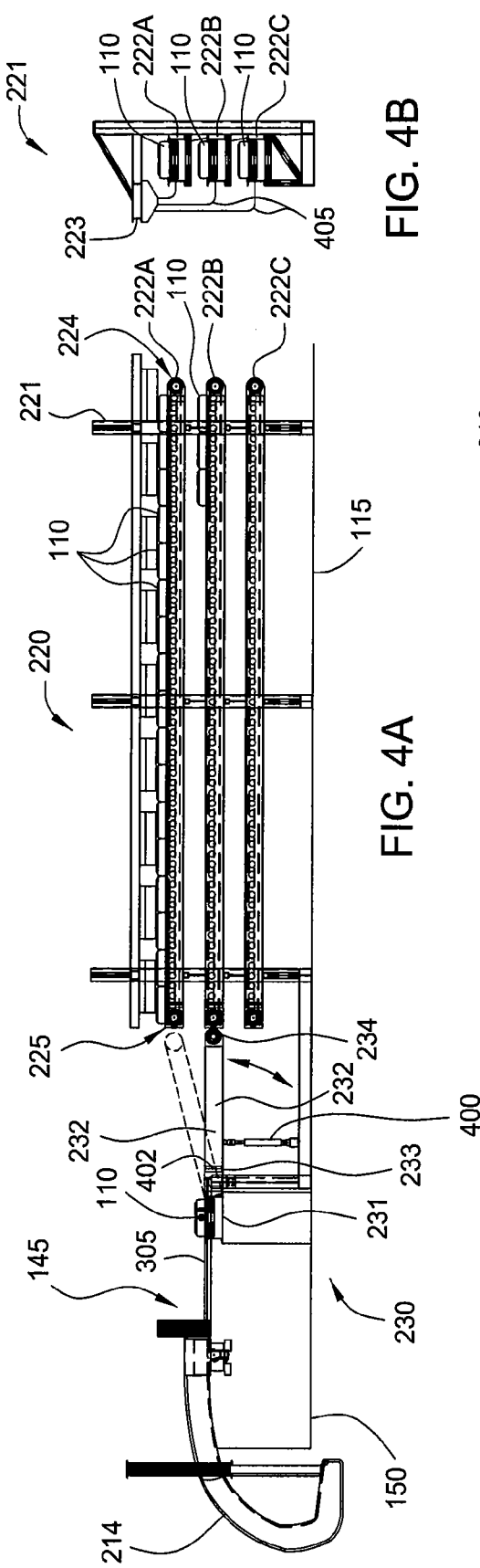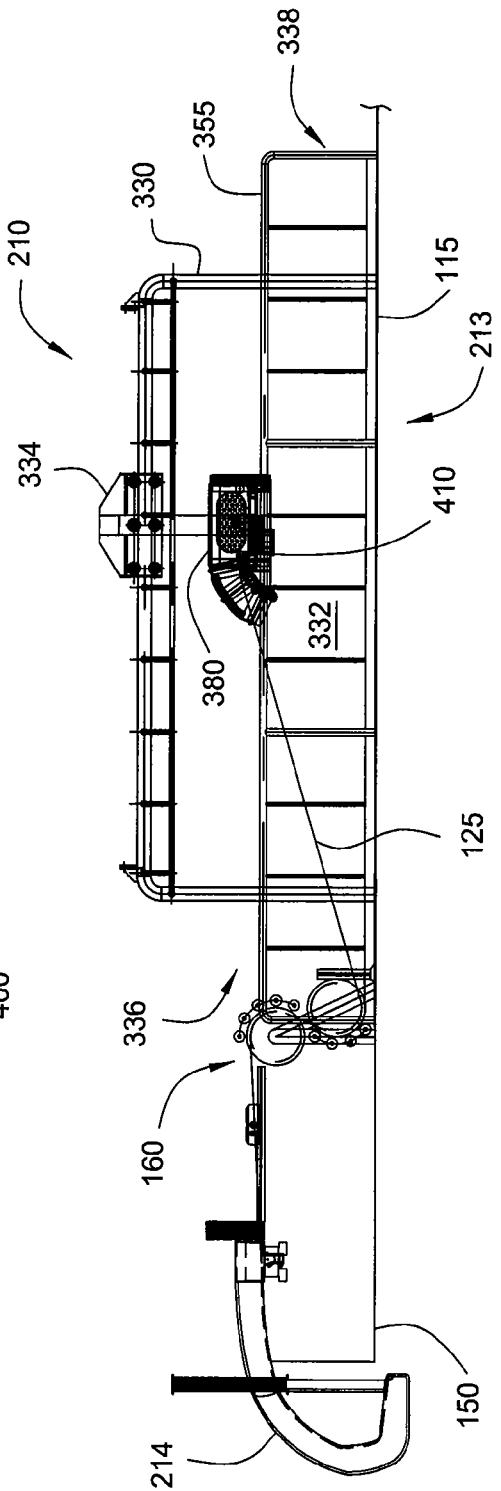

NODE STORAGE, DEPLOYMENT AND RETRIEVAL SYSTEM

CROSS-REFERENCE TO RELATED APPLICATIONS

This application is a continuation of U.S. patent application Ser. No. 12/165,234, filed Jun. 30, 2008, which issued as U.S. Pat. No. 7,883,292 on Feb. 8, 2011, the disclosure of which is hereby incorporated by reference herein.

BACKGROUND OF THE INVENTION

1. Field of the Invention

Embodiments of the invention relate to seismic exploration in marine environments.

2. Description of the Related Art

Seismic exploration operations generally utilize a seismic energy source to generate an acoustic signal that propagates into the earth. The acoustic signal is partially reflected by subsurface seismic reflectors in the earth, which may include interfaces between subsurface lithologic or fluid layers that may be characterized by different elastic properties. The reflected signals are detected and recorded by seismic receiver units located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Generally, the method for detection and recording of seismic signals is similar on land and in marine environments; however, marine environments present unique challenges due to the body of water overlaying the earth's surface. Seismic exploration operations in marine environments are typically conducted from the deck of one or more seismic exploration vessels, such as floating platforms or ships. The seismic exploration vessels typically provide storage and transportation for a plurality of seismic receiver units and associated operational equipment. Seismic exploration in deep water typically uses seismic sensor units deployed from the deck of the seismic exploration vessel to be placed on or near the seabed. These seismic sensor units are part of systems typically referred to as Ocean Bottom Cabling (OBC) or Ocean Bottom Seismometer (OBS) systems, wherein data from a seismic survey may be received.

In order to realize a safe and efficient seismic operation on the deck of the vessel, which typically has limited open space, organization of both equipment and personnel is required in order to maintain safety and efficiency. Thus, even in fair weather and calm sea conditions, simple deployment and retrieval of seismic receiver units in marine environments must be conducted methodically with due care. Further, as the vessel may be operated in harsh weather conditions, such as high seas and wind, the safety and efficiency of the seismic operation is more difficult to maintain. These factors have become even more significant as exploration operations have moved to deeper and deeper water, where operations require longer periods of offshore time.

Conventionally, sensor units are stored on the deck of the vessel in crate-like devices or static storage racks that require individual sensor units to be handled multiple times by personnel on the vessel. In some conventional systems, a robotic device may be used to remove individual sensor units from storage racks; however, robotic devices require a large amount of deck space to operate, thereby limiting the deck space available for sensor storage, retrieval and deployment.

Thus, there is a need for an improved method and apparatus for deployment and retrieval of sensor units from the deck of a seismic exploration vessel.

SUMMARY OF THE INVENTION

Embodiments of the invention relate to seismic exploration in marine environments. In one embodiment, a marine vessel having a leading end and a trailing end is provided. The marine vessel includes a cable handling system disposed on the marine vessel between the leading end and the trailing end. The cable handling system comprises a cable handler positioned proximate the trailing end, and a cable storage device positioned forward of the cable handler, the cable storage device and the cable handler adapted to receive a flexible cable and define a portion of a cable path therebetween. The marine vessel also includes a seismic device storage structure extending between the leading end and the trailing end and disposed substantially parallel to the cable path, a ramp coupled to a portion of the trailing end of the vessel aft of the cable handler, and a staging section disposed between the seismic device storage structure and the ramp to provide transfer of seismic devices between the seismic device storage structure and the ramp.

In another embodiment, a marine vessel having a leading end and a trailing end is provided. The marine vessel includes a cable handling system disposed on the marine vessel between the leading end and the trailing end. The cable handling system comprises a cable handler positioned proximate the trailing end, and a cable storage device positioned forward of the cable handler, the cable storage device and the cable handler adapted to receive a flexible cable and define a portion of a cable path therebetween. The marine vessel also includes a seismic device storage structure extending between the leading end and the trailing end and disposed substantially parallel to the cable path, a ramp coupled to a portion of the trailing end of the vessel aft of the cable handler, and a staging section disposed between the seismic device storage structure and the ramp to provide transfer of seismic devices between the seismic device storage structure and the ramp, wherein the staging section comprises a stationary conveyor and an elevating conveyor, each of the stationary conveyor and the elevating conveyor comprise a movable surface, and the elevating conveyor having one end that is movable relative to the seismic device storage structure.

In another embodiment, a marine vessel having a leading end and a trailing end is provided. The marine vessel includes a cable handling system disposed on the marine vessel between the leading end and the trailing end. The cable handling system comprises a cable handler positioned proximate the trailing end, and a cable storage device positioned forward of the cable handler, the cable storage device and the cable handler adapted to receive a flexible cable and define a portion of a cable path therebetween. The marine vessel also includes a ramp coupled to a portion of the trailing end of the vessel aft of the cable handler, a seismic device storage structure comprising a plurality of conveyor sections extending between the leading end and the trailing end and disposed substantially parallel to the cable path, each of the plurality of conveyor sections comprising a movable surface, and a staging section disposed between the seismic device storage structure and the ramp to provide transfer of seismic devices between the seismic device storage structure and the ramp.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a schematic side view of a portion of the node storage and handling system shown in FIG. 3.

FIG. 4B is a schematic side view of the conveyor section of FIG. 4A having one embodiment of a node servicing system.

FIG. 4C is a schematic side view of the cable handling system shown in FIG. 3.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally provide methods and apparatus for organization and safety of a marine vessel used in a seismic exploration operation, although certain embodiments of the apparatus and methods may be extended to other operations and industries, such as land based materials handling operations. In some embodiments, an apparatus and method of handling, storage, deployment and/or retrieval of one or more seismic sensors in or on a body of water is described. These seismic sensors may include seismic devices used in Ocean Bottom Cabling (OBC) or Ocean Bottom Seismometer (OBS) systems. The seismic devices may be interconnected electronically, such as by wires or wireless communication links, or may be discrete units where data is stored and/or recorded. In some embodiments, the seismic devices may be detachably coupled to a length of rope or cable during deployment and/or retrieval operations. One type of seismic device includes a self-contained ocean bottom sensor unit, sometimes referred to as a Seafloor Seismic Recorder (SSR), which is configured to receive, record, and store seismic data. SSR's are typically detachably coupled to a length of rope or cable during deployment and retrieval operations. An example of a self-contained ocean bottom sensor unit is described in FIGS. 1-8 of U.S. Pat. No. 7,310,287, which issued Dec. 18, 2007, and is incorporated herein by reference. Although embodiments described herein are exemplarily described with seismic sensor units that may be detachably coupled to a rope or cable during deployment and/or retrieval operations, the handling methods and apparatus may be used with other devices and in other industries. The seismic sensor units as described herein may be used in OBS systems or OBC systems and are collectively referred to herein after as nodes for ease of description.

Figure 1A:
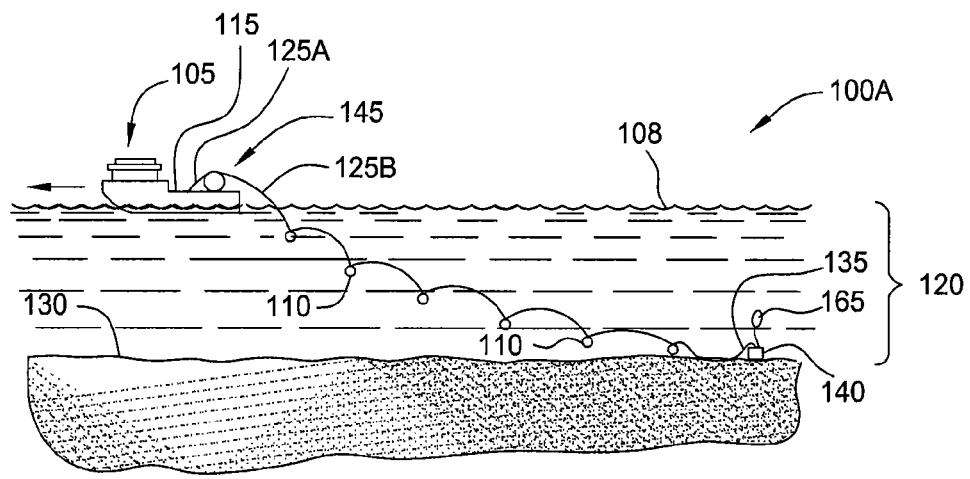
FIG. 1A is a schematic view of one embodiment of a node deployment operation.

FIG. 1A is a schematic view of one embodiment of a node deployment operation 100A. A vessel 105 is positioned on a body of water 108 to deploy nodes 110 from a backdeck 115 of the vessel 105 into a water column 120, although other deployment locations from the vessel 105 may be used. Examples of other deployment locations include the bow or side of the vessel. The power and/or momentum of the vessel 105 may be used to assist in paying out a cable 125A and 125B to which nodes 110 are attached. In this example, a plurality of nodes 110 are tethered to a non-rigid cable 125A to form a mainline cable 125B that is deployed into the water column 120 using the power and/or momentum of the vessel 105. The mainline cable 125B sinks to a resting position on or near a floor 130 of the water column 120. In one embodiment, a free end 135 of the mainline cable 125B is attached to an anchor device 140 such that the cable 125A may be spooled, paid-out, or otherwise deployed from the backdeck 115 of the vessel 105. The free end 135 may also be coupled to a flotation or buoyancy device 165 that may be selectively actuated to assist in locating and/or retrieving the cable 125 after the survey is completed.

As the cable 125A is routed over the backdeck 115, the cable 125A passes a workstation 145 where nodes 110 may be attached to the cable 125A to form the mainline cable 125B. In one example, the nodes 110 are attached individually and sequentially to the cable 125A by personnel on the vessel 105, or suitably mechanically attached to the cable 125A, as the cable 125A passes the workstation 145. Once the mainline cable 125B is positioned on or near the floor 130, a seismic survey may be performed. Upon completion of the seismic survey, the mainline cable 125B may be retrieved from the water column 120. In one embodiment, the buoyancy device 165 is actuated to bring a free end 135 near the surface of the water column 120 where personnel on the vessel 105 may acquire and secure the mainline cable 125B.

Figure 1B:
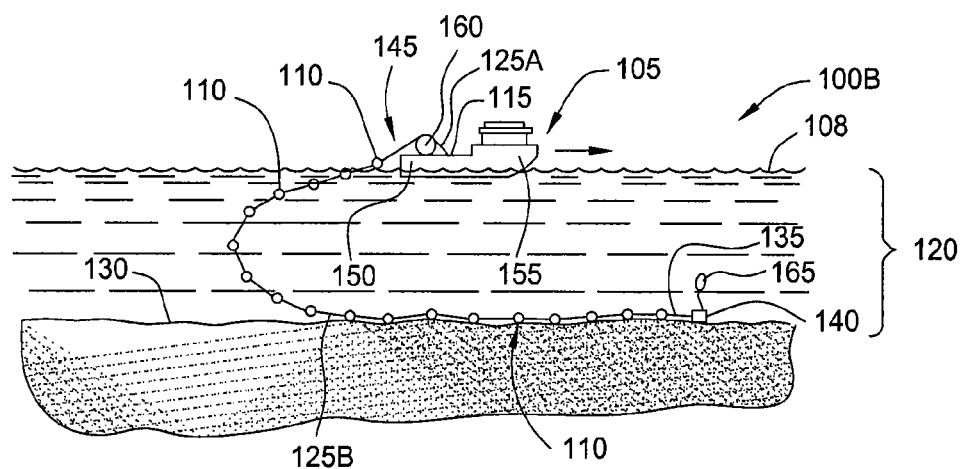
FIG. 1B is a schematic view of one embodiment a retrieval operation.

FIG. 1B is a schematic view of one embodiment a retrieval operation 100B. The vessel 105 has a trailing end 150 and a leading end 155. In this example, the mainline cable 125B is retrieved over the trailing end 150, typically the stern, of the vessel 105 as the leading end 155, typically the bow, of the vessel travels over the mainline cable 125B disposed on the floor 130 in the general direction toward the anchor device 140. The "over the stern" retrieval method uses the water column 120 to reduce dragging, excess tensioning and/or pulling of the cable 125B across the floor 130 as the cable 125B is retrieved.

In one embodiment, the mainline cable 125B is retrieved using a cable handler 160, which may be a winch or a power block, a powered reel, pulley or sheave device. During retrieval, the mainline cable 125B is routed across a portion of the workstation 145 of the vessel 105. As the mainline cable 125B passes by the workstation 145, nodes 110 are detached from the cable 125A. In one embodiment, the nodes 110 are detached by personnel on the vessel 105 or suitable mechanical device at or near the workstation 145. After the nodes 110 are detached, the nodes 110 are stowed in a storage device and serviced, if necessary. In one embodiment, the nodes 110 are routed to a storage device where data is collected, batteries are charged, and general servicing, such as quality control and/or the maintenance may be performed.

Figure 2:
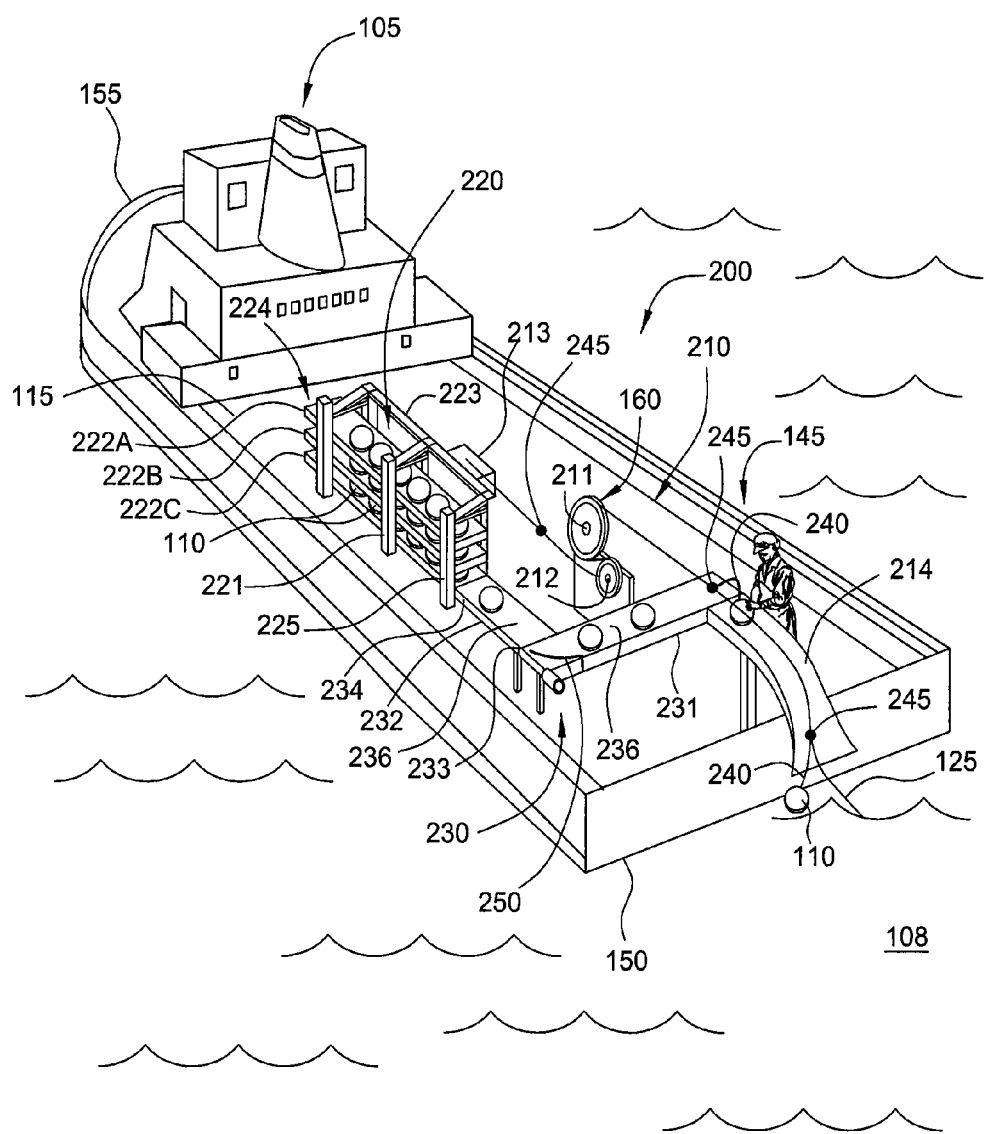
FIG. 2 is a perspective view of a seismic vessel on a body of water.

FIG. 2 is a perspective view of a seismic vessel 105 on a body of water 108 having one embodiment of a node storage and handling system 200. The node storage and handling system 200 includes a cable handling system 210 and a storage device 220 coupled by a staging portion 230. The node storage and handling system 200 facilitates storage of a plurality of nodes 110 while providing automated routing of nodes 110 during handling, such as during a deployment or retrieval operation.

The storage device 220 includes a conveyor system 221 to store and/or transfer the plurality of nodes 110. In this example, the conveyor system 221 is linear and includes three stacked and independently actuatable conveyor sections 222A, 222B and 222C at different heights above the backdeck 115, although any number of conveyors may be used. In other embodiments, the conveyor system 221 may be non-linear, such as an arcuate conveyor system, for example, a carousel-type conveyor system. Each of the conveyor sections 222A-222C include a movable upper surface adapted to support a plurality of nodes 110. In one embodiment, each conveyor section 222A-222C includes a rotatable belt or mesh adapted to support and transfer the nodes 110. The rotatable belt or mesh on each of the conveyor sections 222A-222C is coupled to a drive configured to move the belt or mesh and transfer the nodes 110. The storage device 220 also includes a node servicing system 223, which may include a data in/data out system and a node recharging system. In one example, the node servicing system 223 comprises a plurality of wires or cables (not shown) which detachably couple to one or more of the plurality of nodes 110.

The cable handling system 210 includes a portion of a workstation 145 where nodes 110 may be attached or detached from the cable 125A, 125B. The cable handling system 210 also includes a cable handler 160 and a cable storage device 213. The cable handler 160 may be a winch, a powered roller, spool, or sheave adapted to retrieve or deploy the cable 125A and/or 125B. The cable storage device 213 may include a cable storage area or bin located in or on the backdeck 115 and may also include a cable handling mechanism, such as a spool, a cable puller, a cable squirter, or other device adapted to lay or pick-up cable 125A from the cable storage area. The cable 125A is routed by the cable handler 160 to or from the cable storage device 213 and a ramp 214 coupled to the trailing end 150, or stern, of the vessel 105. The cable 125A (or 125B) is routed across the workstation 145, which includes a portion of the ramp 214 and a portion of the staging portion 230. In one embodiment, the cable handler 160 includes a powered pinch sheave 211 and an idler 212 such that the cable 125A is routed in an "S" fashion through the cable handler 160.

The storage device 220 and the cable handling system 210 are coupled with the staging portion 230 such that nodes 110 may be provided from the cable handling system 210 to the storage device 220, or vice versa. The staging portion 230 includes at least a portion of the workstation 145 so personnel may attach or detach nodes 110 from the cable 125A (or 125B). The staging portion 230 also includes a stationary conveyor 231 coupled between at least a portion of the ramp 214 at one end, and coupled to or adjacent a movable conveyor 232. Each of the conveyors 231 and 232 include a movable upper surface 236 adapted to support one or more nodes 110. Each of the conveyors 231 and 232 may include a rotatable belt or mesh conveyor having an upper surface adapted to support one or more nodes 110. The rotatable belt or mesh on each of the conveyors 231 and 232 are coupled to a drive configured to move the belt or mesh and transfer the nodes 110.

The movable conveyor 232 has a first end 233 that substantially matches a height of the upper surface of the stationary conveyor 231 and a second end 234 that may be raised or lowered relative to a second end 225 of the conveyor system 221. The interface between the stationary conveyor 231 and the movable conveyor 232 may include matching respective heights such that nodes 110 may be transported between the conveyors 231, 232 in a seamless fashion. The second end 234 may be raised or lowered to substantially match the height of one of the conveyor sections 222A-222C in a manner that provides a travel path from each of the conveyor sections 222A-222C to the stationary conveyor 231, and vice versa. As the stationary conveyor 231 and movable conveyor 232 are coupled together at a substantially normal or transverse orientation, a diverter 250 may be coupled above an upper surface of the stationary conveyor 231. The diverter 250 is configured to turn or re-orient nodes 110 at the interface between the movable conveyor 232 and stationary conveyor 231 and may be coupled in a manner that does not interfere with the movement of the upper surface of the stationary conveyor 231 or the movable conveyor 232.

Figure 6:
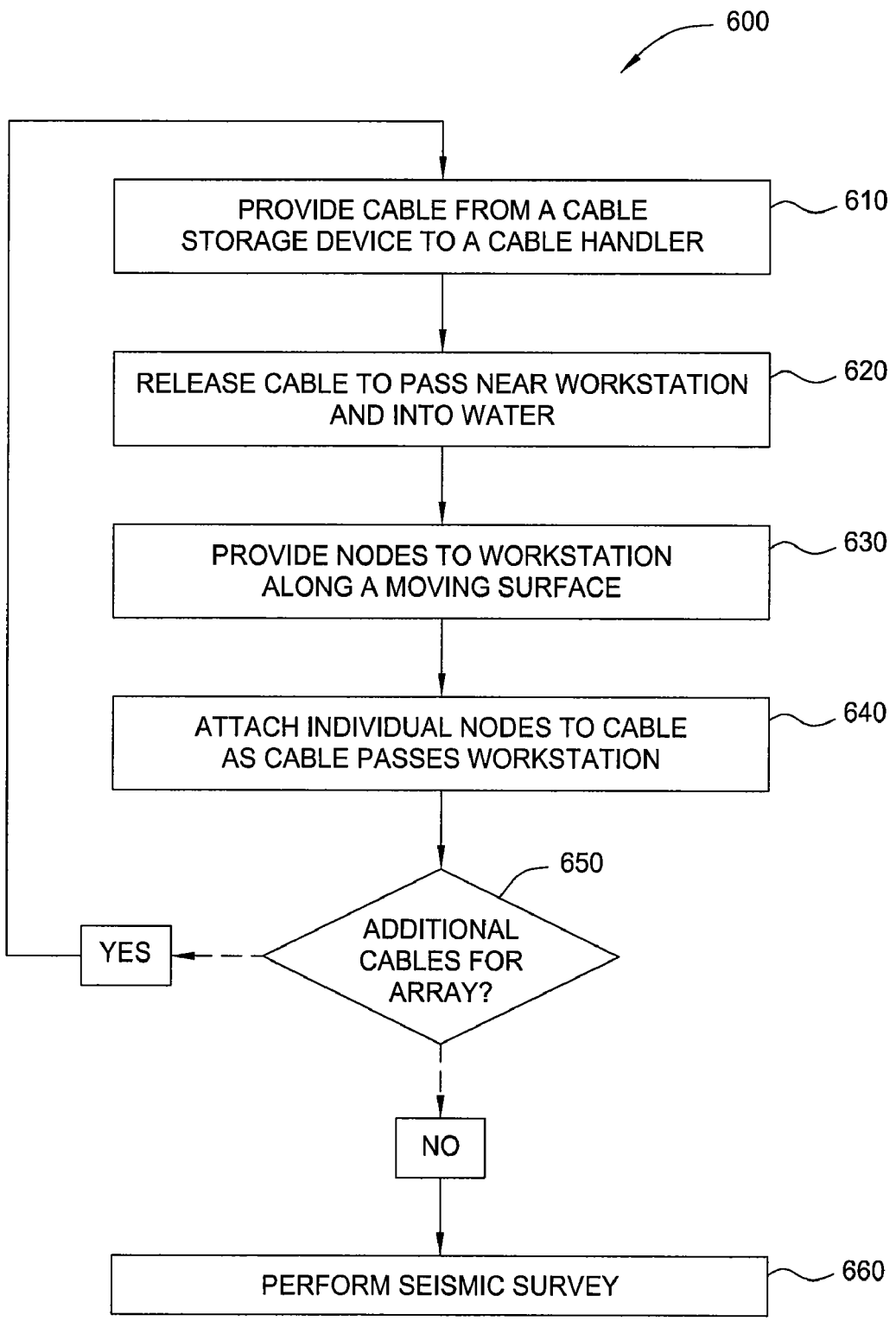
FIG. 6 is a flowchart showing one embodiment of a deployment method.

In a deployment operation, which is further detailed in FIG. 6, the cable 125A may be coupled to the cable handler 160 and routed to pass near the workstation 145. Nodes 110 may be routed from one of the conveyor sections 222A-222C across the movable conveyor 232 and the stationary conveyor 231 to the workstation 145. At the workstation, personnel may attach the nodes to the cable 125A at node attachment points 245 disposed on the cable 125A. In one embodiment, personnel at or near the workstation 145 may attach a rope, tether, chain or cable, such as a lanyard 240, to the cable 125A. The lanyard 240 may be a flexible and adapted to couple at one end to a node 110 and at another end to the cable 125 at the node attachment point 245. In one embodiment, the lanyard 240 is a non-conductive rope, chain or cable. The lanyard 240 may be tied or otherwise fastened to each of the node attachment point 245 and node 110, or clamp devices, such as D-rings, shackles, clips or carabineer clamps.

As the cable 125A is deployed from the vessel 105, the nodes 110 and cable 125A fall through the water column 120 to rest at or near the floor 130, as shown as the mainline cable 125B in FIG. 1A. This operation continues until the cable 125A is paid out to a second end where an anchor device and/or flotation device is coupled to a free end described in FIG. 1A. Additional lengths of cable 125A may be coupled to the cable handler 160, and paid out similarly to the operation described above, until an array of mainline cables 125B is laid out on the floor 130. Once one or more cables having attached nodes are positioned on the floor 130, a seismic survey may be performed.

Figure 7:
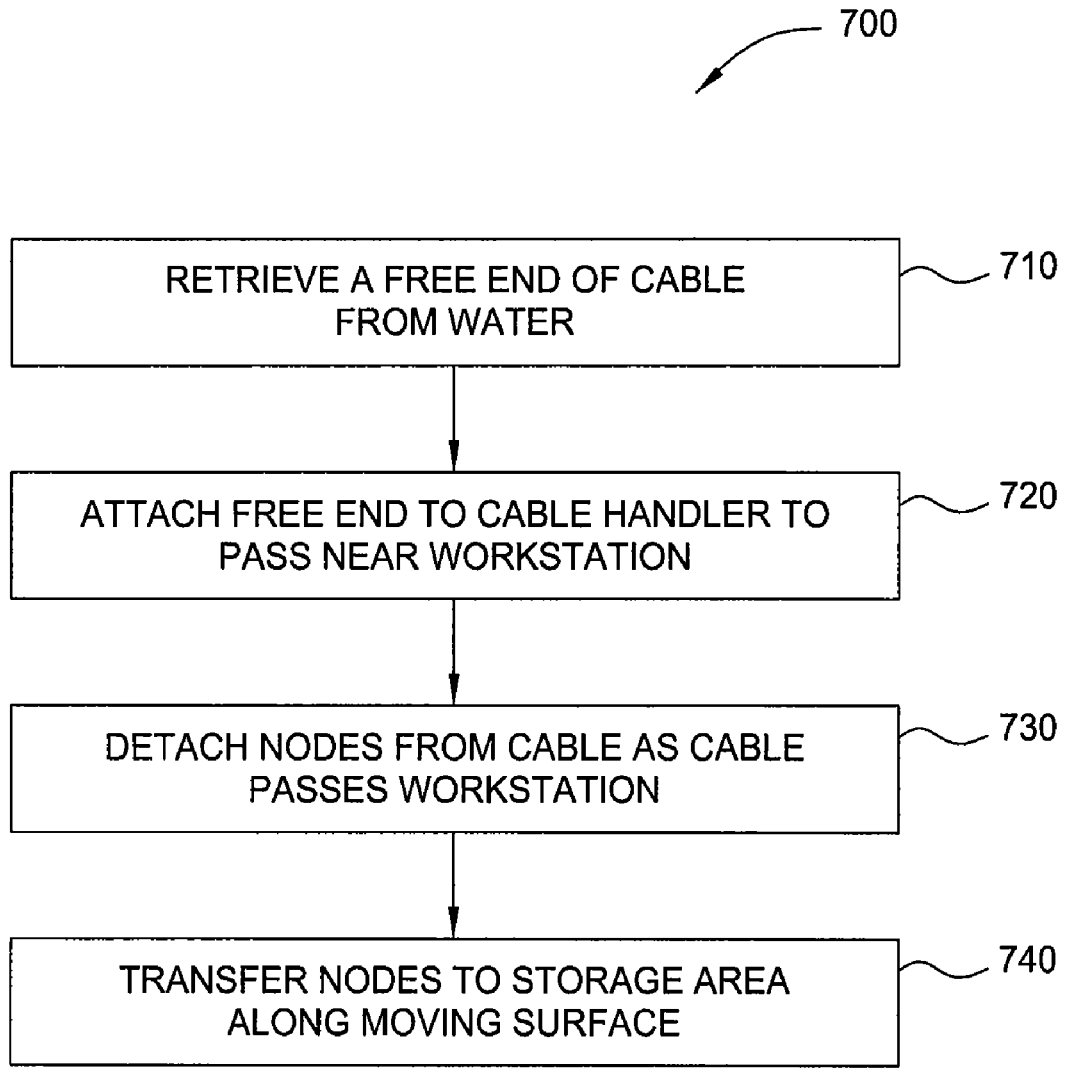
FIG. 7 is a flow chart showing one embodiment of a retrieval method.

A retrieval operation may be performed in a generally reverse manner after the seismic survey is performed, which is further illustrated at FIG. 7. One of the free ends of the cable 125B is interfaced with the cable handler 160. As the cable 125B is hauled out of the water and onto the vessel 105 where the cable 125B passes over the workstation 145, personnel detach the nodes 110 and/or lanyards 240 from the cable 125B. Nodes 110 may be routed to one of the conveyor sections 222A-222C by the stationary conveyor 231 and movable conveyor 232 for storage, data retrieval, charging and maintenance.

Figure 3:
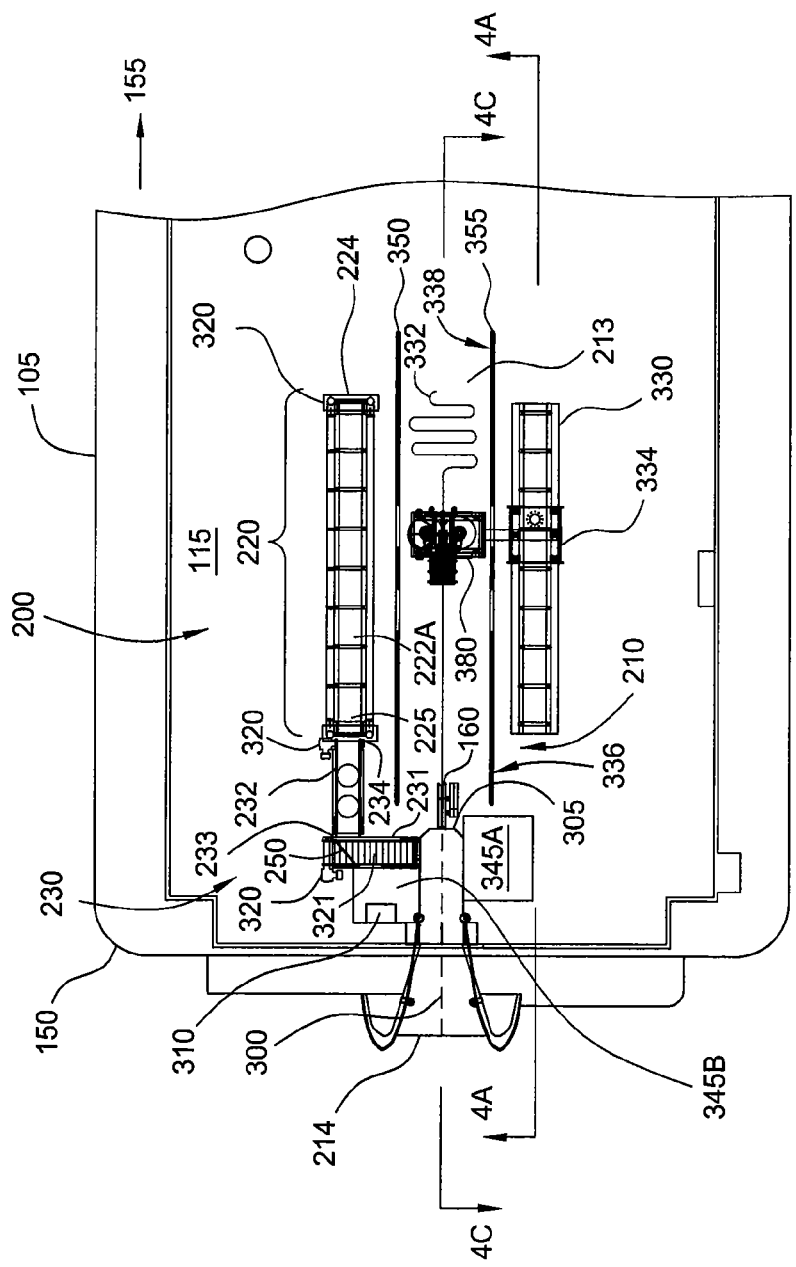
FIG. 3 is a schematic plan view of a portion of a vessel having one embodiment of a node storage and handling system.

FIG. 3 is a schematic plan view of a portion of a vessel 105 having one embodiment of a node storage and handling system 200. The node storage and handling system 200 includes a cable handling system 210 and a storage device 220 coupled by a staging portion 230. The staging portion 230 includes a movable conveyor 232 mounted to align with a conveyor system 221 along a line parallel to a cable path 300 (shown as a dashed line) and a stationary conveyor 231 mounted generally transverse to the cable path 300. Each of the conveyors 231, 232, and each conveyor section disposed in the conveyor system 221 (only section 222A is shown) includes a drive system 320 that may be a reversible, variable speed motor that provides bidirectional and controlled movement of the conveyors and the nodes thereon. As the stationary conveyor 231 and movable conveyor 232 are coupled together at a substantially normal or transverse orientation, a diverter 250 may be coupled above an upper surface of the stationary conveyor 231. The diverter 250 is configured to turn or re-orient nodes 110 at the interface between the movable conveyor 232 and stationary conveyor 231 and may be coupled in a manner that does not interfere with the movement of the upper surface of the stationary conveyor 231 or the movable conveyor 232. In one embodiment, the diverter 250 is a straight or curved plate disposed above a movable upper surface 236 of the stationary conveyor 231. In one specific embodiment, the diverter 250 is disposed above the movable upper surface 236 at about a 45° angle to the travel direction of the movable upper surface 236.

The backdeck 115 of the vessel 105 may also include one or more workstations 345A and 345B where personnel may handle nodes along the cable path 300 between a portion of the ramp 214 and cable handler 160. Each of the workstations 345A, 345B are adjacent a tray 305 that lies under or on the cable path 300. Each workstation 345A, 345B includes a portion of the backdeck 115 sufficient for at least one person to easily and safely access the cable and/or nodes 110. At least one of the workstations 345A, 345B may include a controller 310 adapted to control one or more functions of the node storage and handling system 200. For example, the controller 310 may allow personnel to control retrieval or deployment speed of the cable handler 160, rotational speeds of one or both of the conveyors 231, 232, a height of the second end 234 of the movable conveyor 232, speeds of individual conveyor sections on the conveyor system 221, and combinations thereof.

The cable handling system 210 includes a cable storage device 213 that includes a cable puller 380 adjacent a cable bin 332. In one embodiment, the cable puller 380 is movably coupled to a frame 330 in a cantilever fashion. The cable bin 332 includes at least two rails 350 and 355 adapted to separate an area from the backdeck 115 for cable storage. The cable puller 380 may be coupled to a trolley 334 disposed on the frame 330. The trolley 334 and cable puller 380 are adapted to move relative to the cable bin 332 to deposit or feed the cable 125A to or from the cable bin 332 in an orderly fashion. For example, during a retrieval operation, the cable puller 380 and trolley 334 may initially be near a first end 336 of the cable bin 332 and move toward a second end 338 to pick up the cable 125A in the bin 332 in a stepwise and orderly fashion. In a retrieval operation, the cable puller 380 and trolley 334 may initially start at the second end 338 and move toward the first end 336 to lay the cable 125A in the bin 332 in a stepwise and orderly fashion.

FIG. 4A is a schematic side view of a portion of the node storage and handling system 200 shown in FIG. 3. At least a portion of the staging portion 230 includes a movable conveyor 232 having a first end 233 and a second end 234. The first end 233 includes a height that substantially equals the height of the stationary conveyor 231 while the second end 234 may move up or down relative to the individual conveyor sections 222A-222C. As an example, the second end 234 of the movable conveyor 232 may be raised to transfer nodes 110 to or from conveyor section 222A, as shown in phantom. An actuator 400, which may be a hydraulic cylinder, a pneumatic cylinder, a lead screw or other linear actuator, may be coupled to the movable conveyor 232 to control vertical positioning of the second end 234. In one embodiment, the first end 233 includes a pivot point 402. The pivot point 402 maintains the height of the upper surface of the movable conveyor 232 with the height of the upper surface of the stationary conveyor 231 while allowing the second end 234 to move up and down.

Each of the conveyor sections 222A-222C may provide storage for and transport a number of nodes 110. In one embodiment, each conveyor section 222A-222C may be configured to store and transport up to about 16 nodes 110 per section, in another example, about 32 nodes may be stored and transported by each section 222A-222C. In another example, each conveyor section 222A-222C may be configured to store and transport up to about 200 nodes per section. The conveyor system 221 may also be of a suitable length or height and may be coupled with additional conveyor systems. For example, the conveyor system 221 includes a first end 224 opposite the second end 225, and a second conveyor system (not shown) may be placed adjacent the first end 224. In this example, conveyor sections 222A-222C may be positioned adjacent other conveyor sections (not shown) such that a greater storage capacity for nodes 110 may be provided.

FIG. 4B is a schematic side view of a conveyor section 221 having one embodiment of a node servicing system 223, which may include a data in/data out system, such as a digital data collection system (DDCS), and a node recharging system. The node servicing system 223 includes a plurality of leads 405 adapted to couple to nodes 110. Each lead 405 may be a wire or cable adapted to transmit data to, or receive data from, a controller, and/or be coupled to a power source to recharge the respective node 110.

FIG. 4C is a schematic side view of the cable handling system 210 shown in FIG. 3. As explained above with reference to FIG. 3, the cable storage device 213 may include a frame 330 that is adjacent a cable bin 332 and a cable puller 380 is movably coupled to the frame 330 in a cantilever fashion. In another embodiment, the cable puller 380 may be directly coupled to rails 350 and 355 (only one is shown in this view) such that the frame 330 and trolley 334 are not needed. For example, the cable puller 380 may include a drive system 410 adapted to move the cable puller 380 relative to the rails 350, 355. In this manner, space on the backdeck 115 required for the cable handling system 210 may be reduced.

Figure 5:
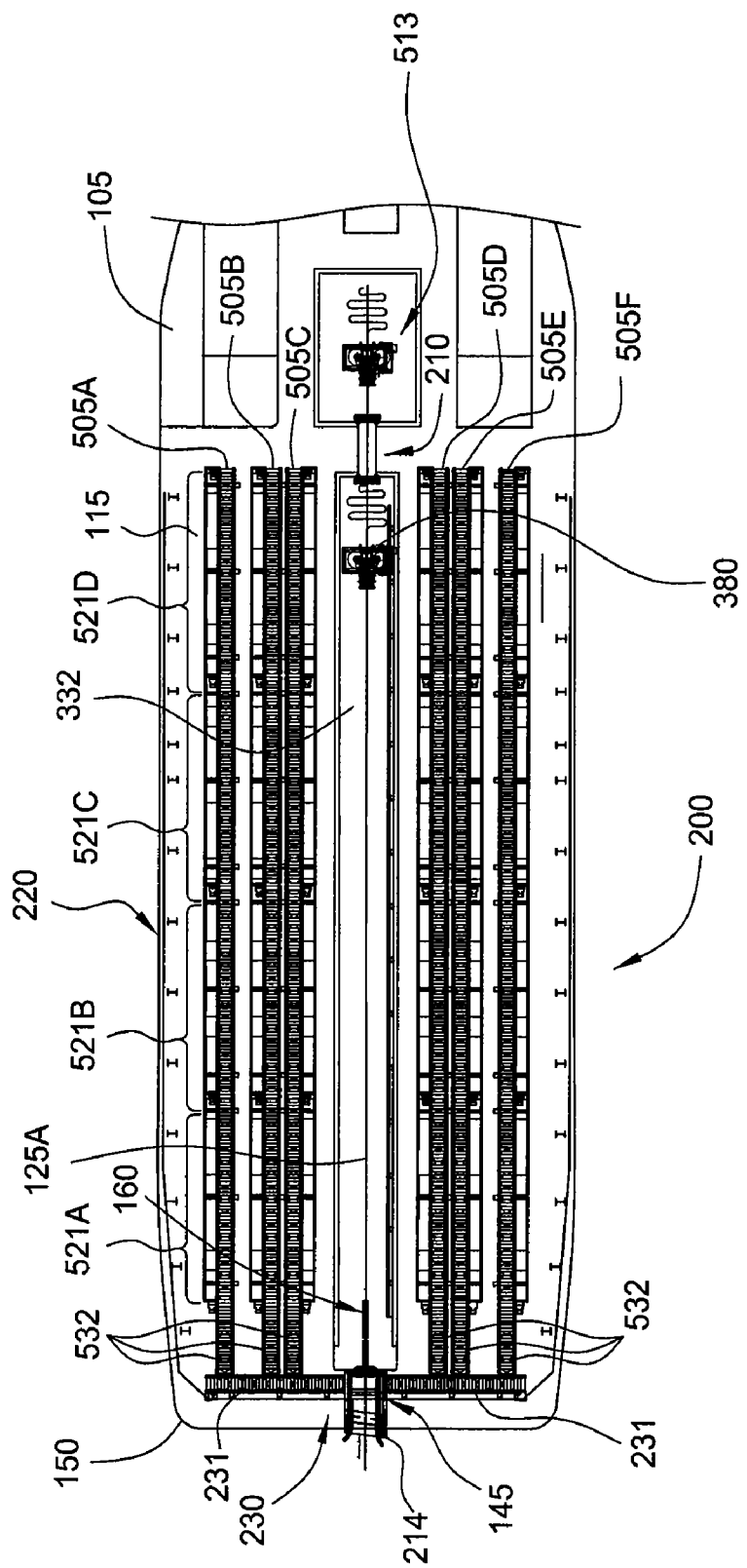
FIG. 5 is a schematic plan view of a portion of a vessel having another embodiment of a node storage and handling system.

FIG. 5 is a schematic plan view of a portion of a vessel 105 having another embodiment of a node storage and handling system 200. In this embodiment, conveyor sections 521A-521D are coupled in an end to end manner to extend the node storage area of the storage device 220. Each conveyor section 521A-521D may be similar to conveyor sections 222A, 222B and 222C as described above. For example, each conveyor section 521A-521D may include three vertically stacked conveyors, or a suitable number of stacked conveyors, such as two or more stacked conveyors. In this embodiment, the conveyor sections 521A-521D are arranged in rows 505A-505F that are substantially parallel to the cable path. Two stationary conveyors 231 are provided along two sides of the ramp 214 to facilitate transfer of nodes 110 to a plurality of movable conveyors 532. The movable conveyors 532 may be similar to the movable conveyors 232 described above, and are aligned with each row 505A-505F. Each row 505A-505F may facilitate storage and transfer of a plurality of nodes 110 and rows may be added or subtracted based on the width of the backdeck 115. In one embodiment, each row 505A-505F facilitates storage and transfer of about 200 nodes 110 per row. In this embodiment, the vessel 105 may store about 1200 nodes 110. A secondary cable storage area 513 may also be added to the vessel 105 to facilitate storage of additional cables 125A.

FIG. 6 is a flowchart showing one embodiment of a deployment method 600. At 610, a cable 125A having a plurality of node attachment points 245 is coupled to a cable handler 160, which may comprise routing a free end of the cable 125A in an "S" fashion through the cable handler 160. The free end of the cable 125A may be coupled to an anchor device 140 and/or flotation device 165 (FIGS. 1A and 1B) and disposed into the water over the trailing end 150 of the vessel 105. At 620, the cable 125A is paid out or controllably released by the cable handler 160 to pass over a portion of or adjacent to the workstation 145 and into the water 108. At 630, nodes 110 are provided to the workstation 145 from the node storage area 220 along a moving surface. In one embodiment, the moving surface includes multiple conveyor belts disposed on each of the conveyor sections 222A-222C, the stationary conveyor 231 and movable conveyor 232. In a specific embodiment, nodes 110 travel from one of the conveyor sections 222A-222C to the stationary conveyor 231 across the movable conveyor 232 to the workstation 145. At 640, individual nodes 110 are attached to the cable 125A as the cable 125A passes the workstation 145. In one embodiment, personnel at or near the workstation 145 may attach a lanyard 240 to the cable 125A. The lanyard 240 may be tied or otherwise fastened to each of the node attachment point 245 and node 110. The operation described at 640 may continue until the cable 125B is released by the cable handler 160 to a second end where another anchor device and/or flotation device may be coupled thereto. The cable 125B may be released from the vessel and allowed to rest at or near the floor of the water column. Alternatively, a free end of another length of cable 125A may be attached to the second end of the cable 125B in order to lengthen the mainline cable 125B. In this embodiment, the method may repeat 610-640 to attach and deploy additional nodes 110 on a second length of cable 125A.

At 650, a determination may be made based on the area of the array to be laid at or near the floor of the water column. If additional mainline cables 125B are needed for the array, additional lengths of cable 125A may be provided and steps 610-640 are repeated to provide additional mainline cables 125B. If additional cables 125B are not needed for the array, and one or more cables having attached nodes are positioned on the floor 130 to define the array, a seismic survey may be performed at 660. At 660, a seismic energy source may be actuated to provide one or more acoustic signals which is propagated into the earth's surface. The reflected signals are detected and recorded by the nodes 110 in the array.

FIG. 7 is a flow chart illustrating one embodiment of a retrieval method 700. After a seismic survey has been performed, and/or a determination has been made to retrieve the cable 125B from the floor 130, a free end of the cable may be retrieved from the water at 710. In one example, a buoyancy device 165 (FIGS. 1A and 1B) may be actuated to raise the free end of the cable 125B. One or both of the buoyancy device 165 and cable 125B may be grabbed or secured by personnel on the vessel. 720 describes attaching the free end to the cable handler 160 in a manner that allows the cable 125 to pass at or near the workstation 145 once the cable 125B is secured by personnel. At 730 nodes are detached from the cable 125B as the cable passes the workstation 145. In one embodiment, personnel at the workstation detach the lanyards 240 from the node attachment points 245 on the cable 125B. At 740 detached nodes 110 are transferred to the node storage area 220 along a moving surface. In one embodiment, the moving surface includes multiple conveyor belts disposed on each of the stationary conveyor 231, the movable conveyor 232 and each conveyor section 222A-222C. In a specific embodiment, nodes 110 travel from the workstation 145 to the stationary conveyor 231 and across the movable conveyor 232 to one of the conveyor sections 222A-222C.

After nodes 110 have been transferred to the conveyor sections 222A-222C, the node servicing system 223 may be interfaced with at least a portion of the retrieved nodes 110. Data may be retrieved and/or the nodes may be recharged and otherwise readied for long-term storage or a subsequent deployment operation.

Figure 8:
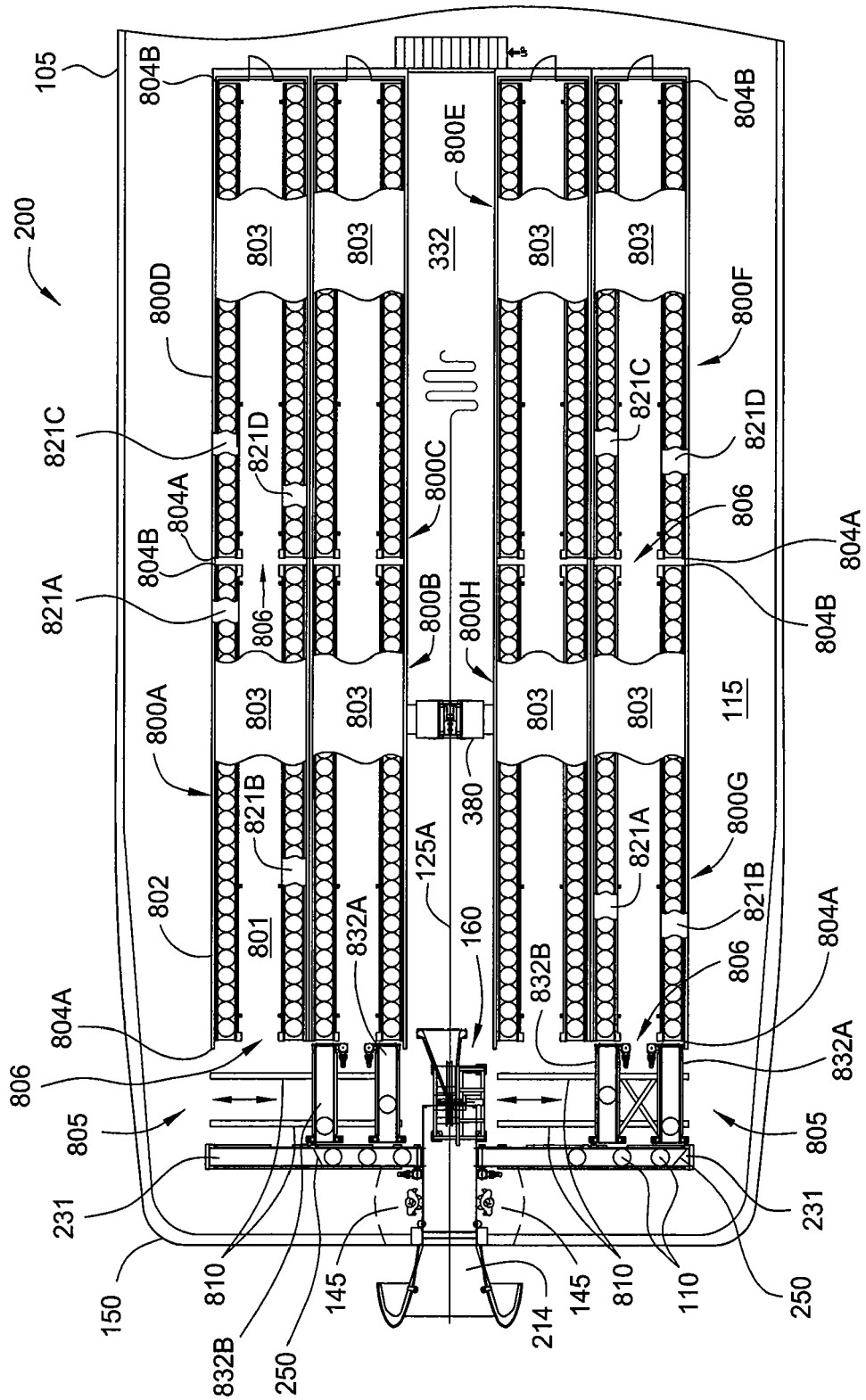
FIG. 8 is a schematic plan view of a portion of a vessel having another embodiment of a node storage and handling system.

FIG. 8 is a schematic plan view of a portion of a vessel 105 having another embodiment of a node storage and handling system 200. In this embodiment, a plurality of conveyor sections providing node storage and transfer are disposed in containers 800A-800H. Each container 800A-800H may be a mobile storage/shipping container unit comprising a floor 801 and sidewalls 802 (shown in reference to container 800A) and a roof 803, a portion of which has been removed to show an interior volume of each container 800A-800H. The interior volume of each container 800A-800H has been adapted to house one or more conveyor systems, shown as conveyor systems 821A and 821B disposed in container 800A and 800G and conveyor systems 821C and 821D disposed in container 800D and 800F. Each container 800A-800H may include two conveyor systems configured as a stacked conveyor system as described above in reference to the conveyor system 221, which includes at least three stacked conveyor sections and a node servicing system.

The containers 800A-800H may be loaded with a plurality of nodes 110 at a dockside location and the containers 800A-800H may be transferred to the backdeck 115 by a crane, forklift, or other lifting device. The containers 800A-800H may be positioned in an end to end relationship along the backdeck 115 and coupled to each other or the vessel 105 to stabilize the containers on the vessel 105. Each of the containers 800A-800H include a first end 804A and a second end 804B having at least a portion of the sidewall 802 removed to form an opening 806. Each container 800A-800H may be positioned end to end to provide transfer of nodes 110 through the openings 806 between the containers. For example, containers 800F and 800G may be positioned end to end in a manner that provides transfer of nodes 110 from conveyor systems 821A to 821C and conveyor systems 821B to 821D, through openings 806, and vice versa. In one embodiment, the node handling and storage system includes eight containers 800A-800H and each of the containers 800A-800H provide storage and transfer of about 218 nodes 110.

In this embodiment, the node storage and handling system 200 includes a travelling conveyor system 805. The travelling conveyor system 805 includes at least one movable conveyor 832A, 832B that is movable in a lateral or transverse direction relative to the cable path of cable 125A. The travelling conveyor system 805 minimizes the footprint of the node storage and handling system 200 by reducing the number of movable conveyors. The travelling conveyor system 805 provides a movable interface between the first ends 804A of each of the containers 800A, 800B, 800H and 800G. Each movable conveyor 832A, 832B may be similar to the movable conveyor 232 as described above, and includes one end that includes a height that substantially equals the height of the stationary conveyor 231 while the second end 234 may move up or down relative to the individual conveyor sections of the conveyor systems 821A and 821B. A diverter 250 may be movably coupled to the stationary conveyors 231 to re-orient the nodes 110 along the travel path as described above.

In one embodiment, the travelling conveyor system 805 includes a rail mechanism 810 coupled to the backdeck 115 and oriented in a substantially parallel direction relative to each of the stationary conveyors 231. Each movable conveyor 832A, 832B may be collectively or individually coupled to the rail mechanism 810 in a manner that the movable conveyors 832A, 832B may be moved laterally or in a parallel direction relative to the stationary conveyor 231. The movable conveyors 832A, 832B may be moved laterally to align with conveyor systems 821A, 821B disposed in the containers 800A, 800B, 800H and 800G to facilitate transfer of the nodes 110 from the conveyor systems 821A, 821B or to the conveyor systems 821A, 821B. The movable conveyors 832A, 832B may be moved in a lateral direction individually or the movable conveyors 832A, 832B may be coupled to each other such that the movable conveyors 832A, 832B move together. The movable conveyors 832A, 832B may be manually moved to align with conveyor systems 821A, 821B and locked in that position to facilitate transfer of the nodes 110. Alternatively, motors or drives (not shown) may be provided to facilitate movement of the movable conveyors 832A, 832B along the rail mechanism 810.

While the foregoing is directed to embodiments of the invention, other and further embodiments of the invention may be devised without departing from the basic scope thereof, and the scope thereof is determined by the claims that follow.

What is claimed is:

1. A marine vessel having a leading end and a trailing end, the marine vessel comprising:
    a cable handling system disposed on the marine vessel between the leading end and the trailing end, the cable handling system comprising:
        a powered pinch sheave positioned proximate the trailing end; and
        a cable storage device positioned forward of the powered pinch sheave, the cable storage device and the powered pinch sheave adapted to receive a flexible cable and define a portion of a cable path therebetween;
    a seismic device storage structure extending between the leading end and the trailing end and disposed substantially parallel to the cable path;
    a ramp coupled to a portion of the trailing end of the vessel aft of the powered pinch sheave; and
    a staging section disposed between the seismic device storage structure and the ramp to provide transfer of seismic devices between the seismic device storage structure and the ramp.

2. The vessel of claim 1, wherein the staging section includes a first conveyor and a second conveyor, each of the first conveyor and second conveyor comprising a movable surface.

3. The vessel of claim 2, wherein the first conveyor is disposed substantially normal to the second conveyor.

4. The vessel of claim 2, wherein the first conveyor has a first end that is pivotally coupled to the second conveyor.

5. The vessel of claim 4, wherein the first conveyor has a second end that is movable relative to the seismic device storage structure.

6. The vessel of claim 1, wherein the seismic device storage structure comprises:
    at least one conveyor system.

7. The vessel of claim 6, wherein the conveyor system comprises:
    a plurality of conveyor sections, each conveyor section comprising a movable surface.

8. The vessel of claim 7, wherein each of the plurality of conveyor sections are vertically stacked.

9. The vessel of claim 7, wherein each of the plurality of conveyor sections are positioned end to end.

10. The vessel of claim 7, wherein the plurality of conveyor sections are vertically stacked and positioned end to end.

11. A marine vessel having a leading end and a trailing end, the marine vessel comprising:
    a cable handling system disposed on the marine vessel between the leading end and the trailing end, the cable handling system comprising:
        a cable handler positioned proximate the trailing end; and
        a cable storage device positioned forward of the cable handler, the cable storage device and the cable handler adapted to receive a flexible cable and define a portion of a cable path therebetween;
    a seismic device storage structure extending between the leading end and the trailing end and disposed substantially parallel to the cable path;
    a ramp coupled to a portion of the trailing end of the vessel aft of the cable handler; and
    a staging section disposed between the seismic device storage structure and the ramp to provide transfer of seismic devices between the seismic device storage structure and the ramp, wherein the staging section comprises a stationary conveyor and an elevating conveyor, each of the stationary conveyor and the elevating conveyor comprise a movable surface, and the elevating conveyor having one end that is movable relative to the seismic device storage structure.

12. The vessel of claim 11, wherein the stationary conveyor is disposed substantially normal to the elevating conveyor.

13. The vessel of claim 11, wherein the seismic device storage structure comprises:
    at least one conveyor system.

14. The vessel of claim 13, wherein the conveyor system comprises:
    a plurality of conveyor sections, each conveyor section comprising a movable surface.

15. The vessel of claim 13, wherein each of the plurality of conveyor sections are vertically stacked.

16. The vessel of claim 13, wherein each of the plurality of conveyor sections are positioned end to end.

17. A marine vessel having a leading end and a trailing end, the marine vessel comprising:
    a cable handling system disposed on the marine vessel between the leading end and the trailing end, the cable handling system comprising:
        a cable handler positioned proximate the trailing end; and
        a cable storage device positioned forward of the cable handler, the cable storage device and the cable handler adapted to receive a flexible cable and define a portion of a cable path therebetween;
    a ramp coupled to a portion of the trailing end of the vessel aft of the cable handler;
    a seismic device storage structure comprising a plurality of vertically stacked conveyor sections extending between the leading end and the trailing end and disposed substantially parallel to the cable path, each of the plurality of conveyor sections comprising a movable surface; and
    a staging section disposed between the seismic device storage structure and the ramp to provide transfer of seismic devices between the seismic device storage structure and the ramp.

18. The vessel of claim 17, wherein each of the plurality of conveyor sections are positioned end to end.

* * * * *